UNITED STATES PATENT OFFICE.

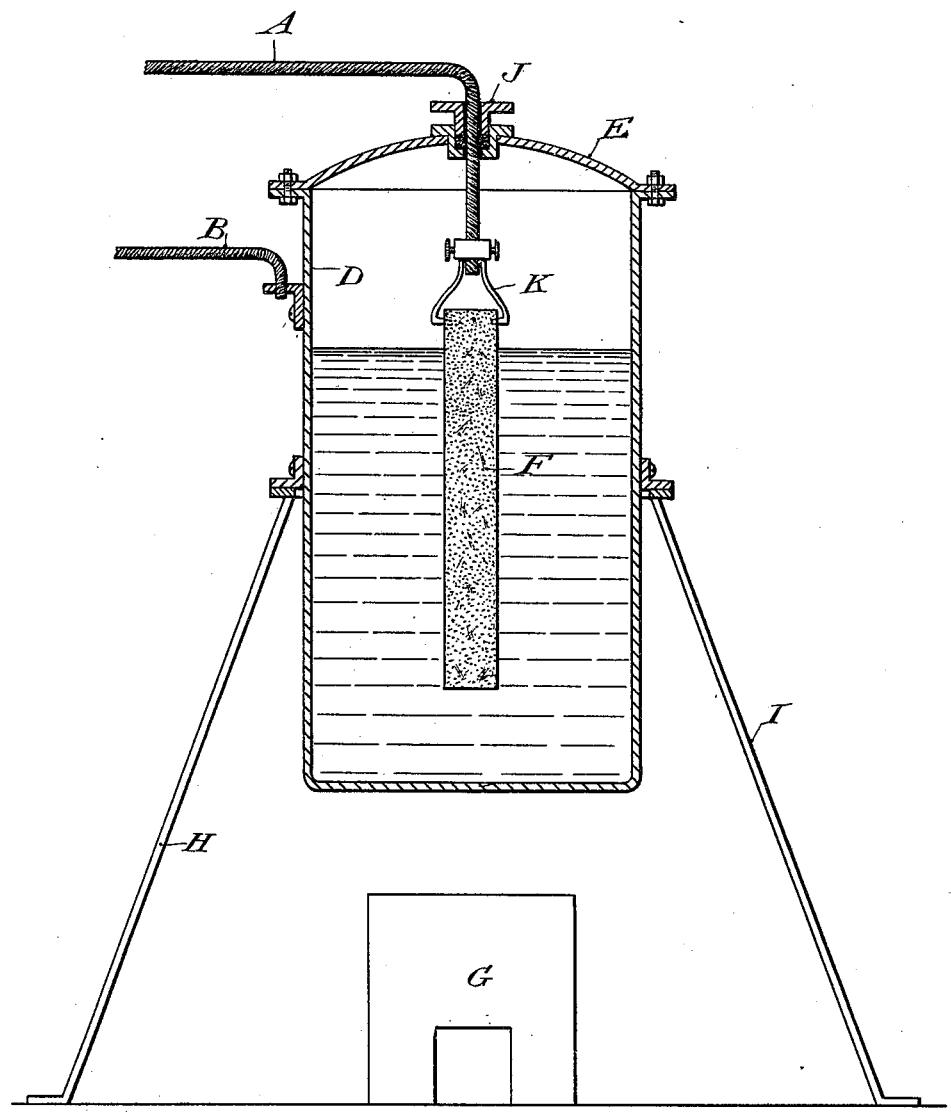

PAUL MAGNIER, OF BILLANCOURT, FRANCE, ASSIGNOR OF TWO-THIRDS TO PIERRE ARMAND BRANGIER AND CHARLES TISSIER, OF PARIS, FRANCE.

PROCESS OF TREATING FATTY SUBSTANCES.

SPECIFICATION forming part of Letters Patent No. 665,244, dated January 1, 1901.

Application filed March 13, 1900. Serial No. 8,491. (No specimens.)

*To all whom it may concern:*

Be it known that I, PAUL MAGNIER, chemist, a citizen of the Republic of France, and a resident of 30 Rue Solferino, Billancourt, Seine, in the Republic of France, have invented new and useful Improvements in the Treatment of Fatty Substances, of which the following is a specification, reference being had to the accompanying drawing, which represents in vertical section an apparatus for carrying out my invention.

My invention relates to the treatment of fatty bodies or substances to produce saponification and to convert the oleic acid into solid fatty acids, and has for its object to provide a process for treating any kind of fatty substances or bodies—such as tallow, oils, vegetable butter, oleic acid, &c.—with a view of producing saponification, if desired—that is to say, when treating neutral fatty bodies—and in all cases with a view of converting the oleic acid into solid fatty acids analogous to those used in the manufacture of candles.

The improved process consists, essentially, in treating fatty substances or bodies with sulfuric acid and subjecting the product or compound thus obtained after being mixed with water to the simultaneous action of an electric current, pressure, and heat.

The fatty substances or bodies to be operated upon are first treated with sulfuric acid. For this treatment the said bodies must be in a fluid condition, and if it is a solid body—such as tallow, for example—I dissolve the same in a fatty liquid, such as oleic acid or oil.

In carrying out my process the procedure is as follows: To the fatty substance, liquid or liquefied, as above described, I add ordinary sulfuric acid. This acid is added in small quantities at a time, and the quantity employed varies to a large extent with the manner of procedure. For example, if the sulfuric acid is added drop by drop while the liquid under treatment is mixed and agitated and then the whole is allowed to stand for a few hours the quantity of acid used can be reduced to ten per cent. or twelve per cent. On the other hand, if precautions are not taken it may be necessary to use as much as fifty per cent. The quantity of sulfuric acid necessary may even be reduced to about six per cent. by heating the fatty body toward 80° centigrade and gradually adding the sulfuric acid at the same time. The product now obtained is added to five or six times its weight of water, preferably hot, so as to obtain an emulsion, which is then passed into an autoclave or digester, such as the vessel D, represented in the accompanying drawing. This vessel should be capable of sustaining a pressure of about five kilograms per square centimeter and is connected with any suitable source of electricity by two conductors A B, of which B is in direct electrical connection with the body of the vessel, which thus constitutes one of two electrodes. The cover E for the hermetic closure of said vessel is furnished with an insulating stuffing-box J, through which the conductor A penetrates to the interior of the vessel, in the center of which is placed the second electrode F, which is of carbon and is suspended from the conductor A by means of the conducting-clamp K. The said vessel is supported over a fireplace or heater G by any suitable supports, as legs I.

The electrical current employed is by preference a continuous one of a strength sufficient to decompose the acidulated water which is in the apparatus, so that, all proportions being preserved, the conditions that must be complied with are the same as those for a current which decomposes the water in a voltameter.

After the emulsion has been passed into the vessel D, as above described, said vessel is closed and its temperature is sufficiently increased to raise the pressure to three, four, or five kilograms per square centimeter, and then an electric current is passed through the mass by means of the electrodes, so as to decompose the water. After a certain interval, which varies according to the nature of the body under treatment, the saponification is complete and the fatty acids float on the top, while the glycerin and the sulfuric acid remain dissolved in the mother-lye.

The free oleic acid which may have been added to the fatty body or which is a result of the saponification is entirely or for the great part converted into solid fatty acids, and the same result will be obtained if the fatty body subjected to the process described is merely oleic acid more or less pure.

The process is stopped after the simultaneous treatment by heat, pressure, and electric current has been sufficiently prolonged, and the magma of fatty acids is then removed from the apparatus and subjected to the usual treatment employed in the manufacture of stearin.

As to the chemical action involved in the process, I have found it impossible to explain it scientifically. It is a fact that if the current is not caused to pass the transformation of the liquid oleic acid liberated from glycerin by saponification is not obtained in solid products capable of being employed for the manufacture of candles, while if the current is made to pass this transformation is rapidly effected. This is a fact that practice demonstrates with certainty.

The mother-lyes are treated in the ordinary manner for extracting the glycerin therefrom.

I claim—

The process herein described for saponifying fatty substances or bodies and converting oleic acid into solid fatty acids which consists in treating the fatty bodies in a fluid condition with sulfuric acid and then subjecting the resulting product or compound, after mixing same with water, to the simultaneous action of pressure, heat and an electric current.

In testimony that I claim the foregoing as my invention I have signed my name, in presence of two witnesses, this 2d day of March, 1900.

PAUL MAGNIER.

Witnesses:
EDWARD P. MACLEAN,
ALCIDE FABE.